United States Patent
Peace et al.

(10) Patent No.: US 7,435,501 B2
(45) Date of Patent: Oct. 14, 2008

(54) FUEL CELL COMPRESSION ASSEMBLY

(75) Inventors: Benjamin N. Peace, Hathern (GB); Anthony Newbold, Sileby (GB); Peter D. Hood, Syston (GB)

(73) Assignee: Intelligent Energy Limited, London (GB)

( * ) Notice: Subject to any disclaimer, the term of this patent is extended or adjusted under 35 U.S.C. 154(b) by 413 days.

(21) Appl. No.: 10/509,441

(22) PCT Filed: Mar. 27, 2003

(86) PCT No.: PCT/GB03/01348

§ 371 (c)(1),
(2), (4) Date: Apr. 22, 2005

(87) PCT Pub. No.: WO03/083977

PCT Pub. Date: Oct. 9, 2003

(65) Prior Publication Data

US 2005/0202304 A1 Sep. 15, 2005

(30) Foreign Application Priority Data

Mar. 28, 2002 (GB) .................. 0207313.8

(51) Int. Cl.
*H01M 8/02* (2006.01)
*H01M 2/02* (2006.01)
(52) U.S. Cl. .......................... 429/37; 429/34
(58) Field of Classification Search ............ 429/34–39; 206/464, 514, 461, 462–471, 3, 701–728; 100/56; 604/192; 70/55; 150/154; 220/796; 49/74.1, 127

See application file for complete search history.

(56) References Cited

U.S. PATENT DOCUMENTS

| 3,134,697 | A | | 5/1964 | Niedrach |
| 4,738,905 | A | | 4/1988 | Collins |
| 5,314,762 | A | * | 5/1994 | Hamada et al. ............... 429/37 |
| 5,419,980 | A | | 5/1995 | Okamoto et al. |
| 5,686,200 | A | | 11/1997 | Barton et al. |
| 5,993,987 | A | | 11/1999 | Wozniczka et al. |
| 6,057,053 | A | | 5/2000 | Gibb |
| 2002/0034673 | A1 | * | 3/2002 | Bisaka et al. ................ 429/37 |

FOREIGN PATENT DOCUMENTS

| DE | 19724428 | 12/1998 |
| JP | 092324 | 8/1997 |
| JP | 10214634 | 11/1998 |
| JP | 167745 | 2/2001 |

OTHER PUBLICATIONS

Search Report for priority Application GB 0207313.8, dated Aug. 20, 2003.
International Search Report for Application PCT/GB03/01348, dated Nov. 23, 2004.

* cited by examiner

*Primary Examiner*—Susy Tsang-Foster
*Assistant Examiner*—Maria J Laios
(74) *Attorney, Agent, or Firm*—Fish & Richardson P.C.

(57) ABSTRACT

A fuel compression assembly includes a carnage unit having at least two opposing side walls maintained in spaced relation by a base member extending between the opposing side walls at a lower position on the opposing side walls. The opposing side walls and the base member define a cradle for receiving fuel cell plates. The opposing side walls each includes at least one engagement member on an internal face for engaging with at top of member that forms a top of the carriage unit.

16 Claims, 5 Drawing Sheets

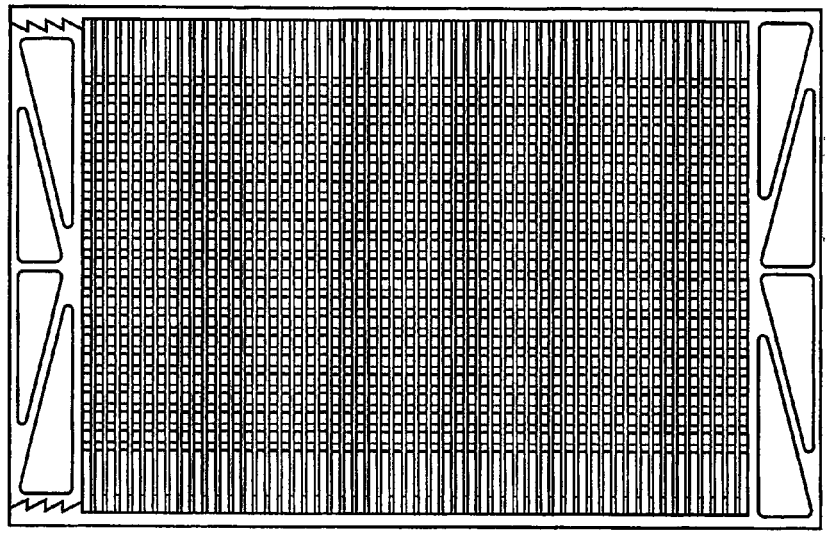
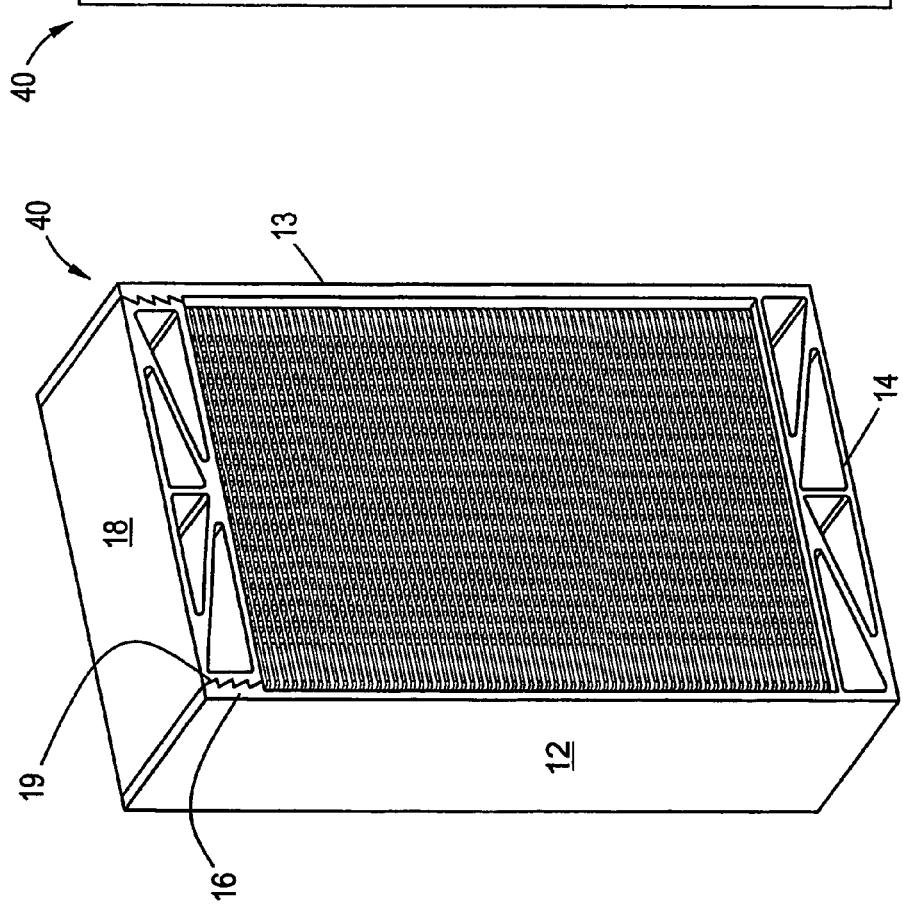

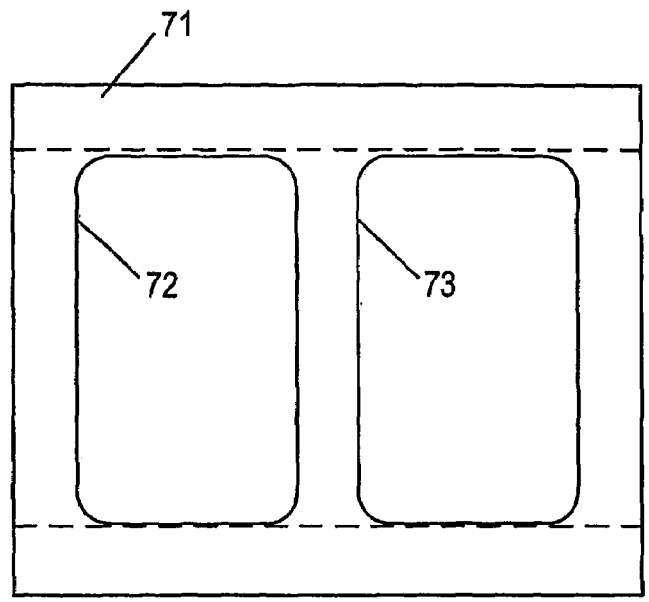
Fig. 7
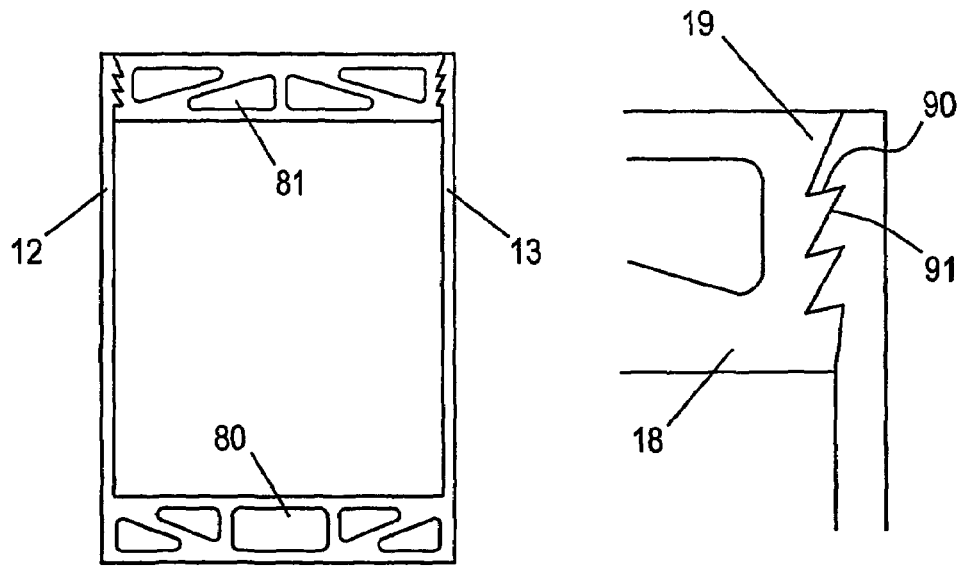
Fig. 8    Fig. 9

US 7,435,501 B2

FUEL CELL COMPRESSION ASSEMBLY

TECHNICAL FIELD

The present invention relates to electrochemical fuel cells, and in particular to methods and apparatus for assembly of a plurality of fuel cell plates into a fuel cell stack.

BACKGROUND

Conventional electrochemical fuel cells convert fuel and oxidant into electrical energy and a reaction product. A typical fuel cell comprises a plurality of layers, including an ion transfer membrane sandwiched between an anode and a cathode to form a membrane-electrode assembly, or MEA.

Sandwiching the membrane and electrode layers is an anode fluid flow field plate for conveying fluid fuel to the anode, and a cathode fluid flow field plate for conveying oxidant to the cathode and for removing reaction by-products. Fluid flow field plates are conventionally fabricated with fluid flow passages formed in a surface of the plate, such as grooves or channels in the surface presented to the porous electrodes.

A typical single cell of a proton exchange membrane fuel cell will, under normal operating conditions, provide an output voltage between 0.5 and 1.0 Volt. Many applications and electrical devices require high voltages for efficient operation. These elevated voltages are conventionally obtained by connecting individual cells in series to form a fuel cell stack.

To decrease the overall volume and weight of the stack, a bipolar plate arrangement is utilised to provide the anode fluid flow field plate for one cell, and the cathode fluid flow field plate for the adjacent cell. Suitable flow fields are provided on each side of the plate, carrying fuel (eg. hydrogen, or a hydrogen rich gas) on one side and oxidant (eg. air) on the other side. Bipolar plates are both gas impermeable and electrically conductive and thereby ensure efficient separation of reactant gases whilst providing an electrically conducting interconnect between cells.

Fluids are conventionally delivered to each fluid flow field plate by way of common manifolds that run down the height of the stack, formed from aligned apertures in each successive plate.

The area of a single fuel cell can vary from a few square centimetres to hundreds of square centimetres. A stack can consist of a few cells to hundreds of cells connected in series using bipolar plates.

Two current collector plates, one at each end of the complete stack of fuel cells, are used to provide connection to the external circuit.

The are a number of important considerations in assembling the fuel cell stack. Firstly, the individual layers or plates must be positioned correctly to ensure that gas flow channels and manifolds are in correct alignment.

Secondly, the contact pressure between adjacent plates is used to form gas tight seals between the various elements in the manifolds and gas flow channels. Conventionally, the gas tight seals include compressible gaskets that are situated on the surfaces of predetermined faces of the plates. Therefore, in order to ensure proper gas tight sealing, an appropriate compression force must be applied to all of the plates in the stack, orthogonal to the surface planes of the plates in the stack, to ensure that all gaskets and sealing surfaces are properly compressed.

Thirdly, a compressive force is essential to ensure good electrical connectivity between adjacent layers.

At the outer ends of the stack, substantially rigid end plates are usually deployed for the application of suitable compression forces to retain the stack in its assembled state.

A number of different mechanisms have been proposed which allow this compressive force to be applied and maintained.

Conventional fuel cell stacks, such as described in U.S. Pat. No. 3,134,697, deploy tie rods, which extend between two end plate assemblies, and pass through holes formed in the periphery of the end plates. These tie rods are commonly threaded and employ fastening nuts to exert and maintain a clamping force.

Alternative configurations, such as described in U.S. Pat. No. 6,057,053, use similar mechanisms but the tie rods pass through the central portion of the stack, and hence active cells, within fluid manifolds or conduits.

Hydraulic methods have been employed, such as described in U.S. Pat. No. 5,419,980, where a pressurised fluid is used to apply a compressive force to the fuel cells via an expandable bladder or balloon.

Clips, such as described in U.S. Pat. No. 5,686,200, and compression bands, such as described in U.S. Pat. No. 5,993,987, have also been proposed.

A disadvantage of existing plate compression systems is that multiple elements are generally required to effect the compression across the entire surface areas of the plates, resulting in a complex assembly technique to ensure that plate alignment and uniform compression across the plate surface are maintained during and after the assembly process.

It is an object of the present invention to provide a fuel cell stack assembly apparatus and method which are simple and cost effective to use. It is a further object of the present invention to provide a highly reliable, uniform compression to the plates in the stack.

The present invention provides a method for applying and retaining compression to the fuel cell stack through the use of a fixed carriage or framework into which the cells can be built directly.

According to one aspect, the present invention provides a fuel cell compression assembly, comprising:
  a carriage unit having at least two opposing side walls maintained in spaced relation by a base member extending therebetween at a lower position on the sides,
  the opposing side walls and base member thereby defining a cradle for receiving fuel cell plates,
  the opposing side walls each including at least one engagement member on internal face for engaging with a top member forming the top of the carriage unit.

According to a further aspect, the present invention provides a fuel cell compression assembly comprising:
  a carriage unit cradle for receiving a stack of fuel cell plates and for maintaining the plates in substantially overlying relationship; and
  a closure member adapted to close the carriage unit and apply pressure to the plates therein, by automatic locking engagement with the cradle when the closure member is brought into position with the cradle in a first direction substantially orthogonal to the plane of the plates.

According to a further aspect, the present invention provides a method of forming a fuel cell stack comprising the steps of:
  providing a carriage unit cradle for receiving a plurality of fuel cell plates into a confinement volume therein;
  installing said fuel cell plates into the cradle to form a stack;

applying a carriage unit closure member to compress the fuel cell plates in a first direction substantially orthogonal to the plane of the plates and to engage the closure member with the cradle;

the carriage unit providing automatic locking engagement of the closure member and the cradle when the closure member has reached an appropriate degree of compression of the plates.

DESCRIPTION OF THE DRAWINGS

Embodiments of the present invention will now be described by way of example and with reference to the accompanying drawings in which:

FIG. 4 shows a perspective front view of an assembled fuel cell with front to back ventilation;

FIG. 5 shows a cross-sectional front view of the assembled fuel cell of FIG. 4;

FIG. 7 shows a face view of an exemplary side wall of a carriage unit;

FIG. 8 shows a cross-sectional front view of an exemplary carriage unit; and

FIG. 9 shows a detailed cross-sectional view of the locking members of a top member and side wall of the carriage unit of FIG. 8.

DETAILED DESCRIPTION

Figure 2:
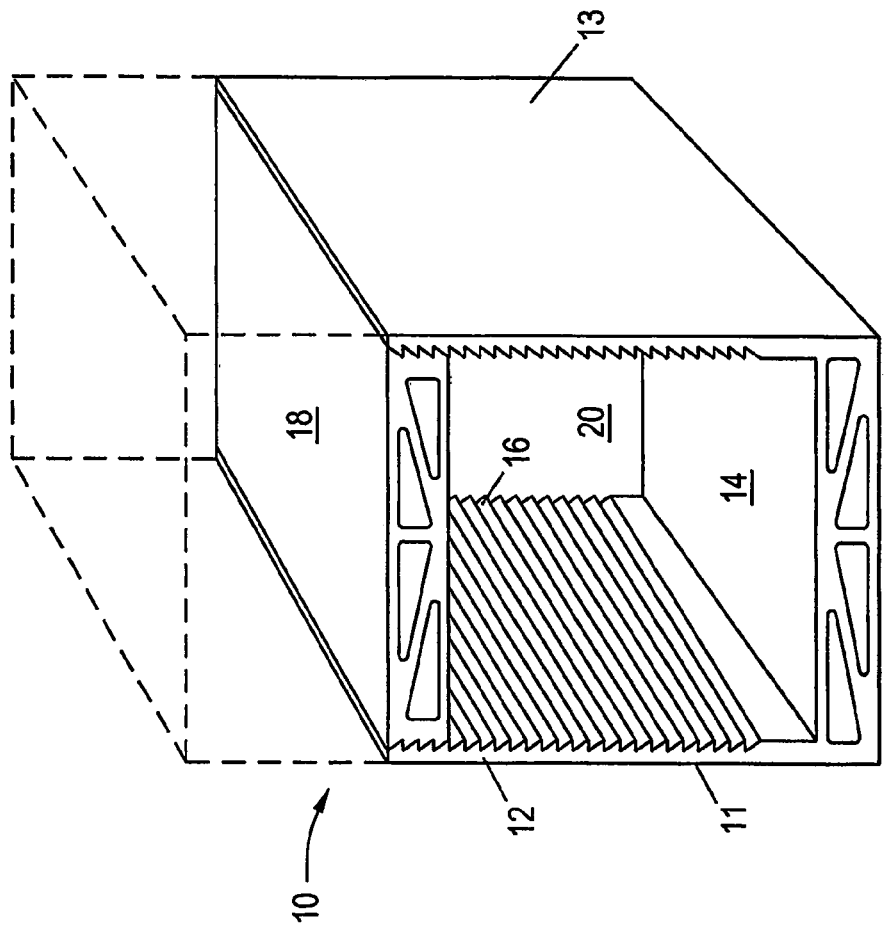
FIG. 2 shows a perspective front view of the fuel cell carriage unit of FIG. 1, with a reduced height.

Throughout the present specification, the descriptors relating to relative orientation and position, such as "top", "bottom", "horizontal", "vertical", "left", "right", "up", "down", "front", "back", as well as adjective and adverb derivatives thereof, are used in the sense of an orientation of fuel cell assemblies as pictured in the drawings. However, such descriptors are not intended to be in any way limiting to an intended use of the fuel cell assemblies, which may be used in any orientation.

Figure 1:
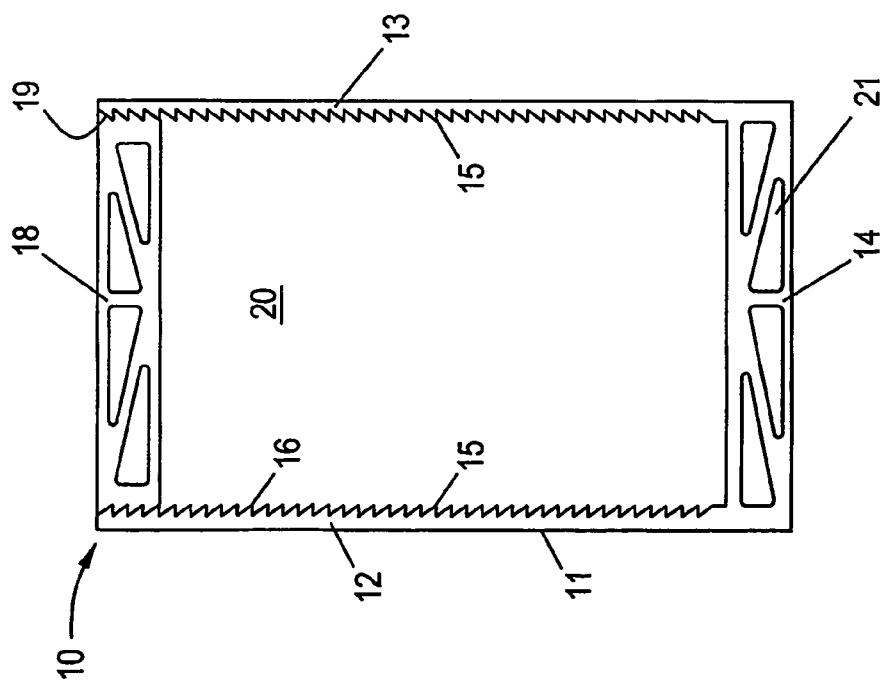
FIG. 1 shows a cross-sectional front view of fuel cell carriage unit according to one embodiment of the present invention.

With reference to FIGS. 1 and 2, a fuel cell compression assembly 10 comprises a carriage unit cradle 11 formed from two opposing side walls 12, 13 that are maintained in parallel spaced relation by a rigid base 14. Each of the side walls 12, 13 provides, on an internal surface 15 thereof, a plurality of parallel ribs or teeth 16 extending along the side walls parallel to, and at a number of predetermined distances from, the base 14. Each of the ribs or teeth 16 is adapted to engage with corresponding ribs or teeth 19 formed in the sides of a rigid top member 18. The top member 18 acts as a closure for the carriage unit.

In the configuration shown, each of the side wall ribs 16, and the corresponding top member ribs 19, has an asymmetric profile as best seen in the detailed cross-sectional profile shown in FIG. 9. The profile as shown for each tooth or rib includes a re-entrant (overhanging) edge 90 and a more gently sloping profile edge 91 to ensure secure engagement and wedge lock of the top member 18 with the respective side walls 12, 13.

It will be appreciated from FIG. 9 that the profile of the fibs 19 on the top member 18 are preferably matched by a complementary profile of ribs 16 on each of the side walls 12, 13.

As shown in FIGS. 1 and 2, the width of the top member 18 is selected equal to the width of the base member 14 such that the side walls are maintained in precise parallel spaced relation once the ribs 16 and 19 are engaged.

The side walls 12, 13 of the carriage unit 11 are formed from a suitable slightly resilient material, such as aluminium, such that the side walls 12 and 13 may be temporarily laterally displaced from one another as the top member 18 is inserted in a downward vertical direction towards the base member 14, into the cavity 20 defined by the carriage unit, allowing passage of ribs 16 and 19 over one another as the top member moves in the downward direction. Preferably, the resilience of the side walls allows for a lateral displacement at least by as much as the height of the ribs.

It will be appreciated that the preferred profile of the teeth or ribs 16 and 19, as shown in the figures, ensures that return of the top member in an upward direction is not possible. The preferred profile of the teeth or ribs 16 and 19, ie. re-entrant, also ensures that any upward pressure on the top member actually results in a tighter binding of the top member and side walls together by means of a wedge lock action.

Thus, it can be seen that the cradle 11 and top closure member 18 provide automatic locking engagement between the cradle and the closure member when the closure member is brought into position with the cradle in a first direction substantially orthogonal to the plane of the plates.

Preferably, the top member and the bottom member are formed in a suitable rigid material in which substantially no flexing, or insufficient flexing to interfere with the satisfactory operation of the engagement mechanism as described above, is permitted. In the preferred embodiment, the top member 18 and the base member 14 are formed from aluminium having a suitable box section cross-braced profile 21 as illustrated in FIGS. 1 and 2, or more preferably, the profiles 80, 81 as particularly illustrated in FIG. 8, to ensure the requisite stiffness.

By contrast, in the exemplary embodiment, the side walls 12, 13 are formed from sheet aluminium having thickness of 2 mm to provide the requisite degree of resilience.

In other embodiments, the rib profile may be any suitable shape in order to facilitate retention of the top member 18 within the side walls 12, 13.

The base member 14 of the carriage unit 11 may be fixed to the side walls by any suitable method, such as screws, bolts, welding, or gluing, or may be formed as a unitary extruded section.

With reference to FIGS. 4 and 5, the internal cavity 20 defined by the carriage unit is filled with successive layers of fuel cell plates as previously described, and overlaid with the top member 18 within a compression jig (not shown). The compression jig provides a suitable downward compressive force in order to compress the resilient seals on the surfaces of the plates and downwardly displace the top member 18 so that it enters the cavity and engages with the side walls 12, 13.

In the embodiment of FIG. 1, the parallel ribs 16 are provided at regular intervals down the height of the side walls 12, 13. This feature enables a standard side of carnage unit to be filled to a desired degree (ie. with the requisite number of plates for the required voltage output) and the top plate to pass over the requisite number of ribs 16 in a ratchet-and-pawl type action, until a correct downward displacement has resulted in the desired compressive force on the installed plates. At that point, the assembly 10 may be removed from the jig, the ribs 16, 19 maintaining the correct position of the top member 18.

The top member 18 is maintained firmly in position by the restitutional force of the fuel cells (in particular the MEAs and gaskets) acting on the co-operating ribs 16, 19.

The depth of the top member 18 (as shown 11 mm in the preferred embodiment of FIG. 8) is preferably not only sufficient to ensure the requisite stiffness, but also to provide sufficient ribs 19 to facilitate proper engagement with the side walls with sufficient retaining force. Preferably, the depth of the top member 18 is also sufficient to ensure that the top member remains orthogonally presented to the side walls during the installation process.

In the embodiment of FIGS. 4 and 5, it will be noted that the ribs 16 only extend a short distance down the depth of the side walls 12, 13. This configuration is adequate where only a predetermined number of plates are to be installed. The necessary compaction forces to achieve effective sealing and electrical connectivity can be calculated and directly related to stack height, thereby allowing accurate determination of engagement points for the ribs. Adjustments in compaction force can be achieved by use of thin incompressible shims which act as spacers adjacent to the end plates.

It will be understood that the ribs 16, 19 may be provided along the entire length of the side walls and corresponding edges of the top member, for maximum contact area between the side walls and top member, or the ribs may be discontinuous at several positions along the length of the side walls and corresponding edges of the top member. Alternatively, there may be provided a discrete number of teeth or other engagement points at respective positions along the length of the side walls and top member.

Preferably, the engagement points are provided at a substantial number of places along the side walls so that the restraining force applied to the fuel cell plates installed in the cradle is substantially uniform over the entire surface area of the plates.

Figure 6:
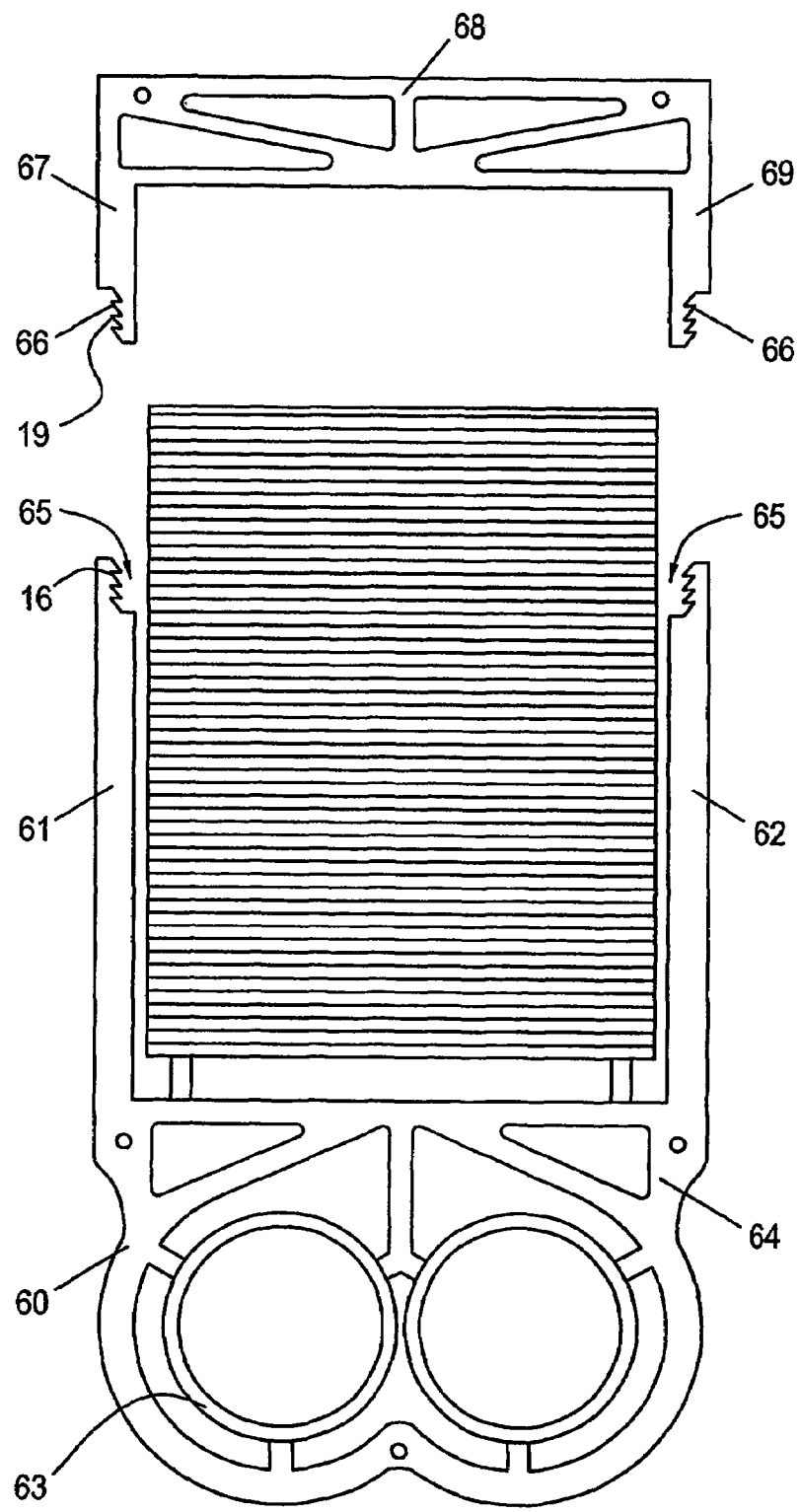
FIG. 6 shows a front view of an alternative configuration of fuel cell in accordance with another aspect of the present invention.

In the preferred embodiments, the ribs or teeth are formed on internal walls of the side walls. With reference to FIG. 6, a further configuration of compression assembly 60 is shown. In this embodiment, the ribs 16 are formed in recesses 65 in the upper ends of the side walls 61, 62, and corresponding recesses 66 are formed in downwardly extending walls 67, 69 of the top member 68. In this manner, the top member forms an extension to the upper portions of the side walls 61, 62 connecting therewith to form the complete closed compression assembly.

It will be appreciated that the side walls ribs 16 need not be inwardly facing, but could be outwardly facing, where the respective recesses 65, 66 of the side walls 61, 62 and top member are reversed.

In an alternative configuration, not shown, the downwardly extending walls 67, 69 could be provided with inwardly extending ribs 66 adapted to engage with corresponding teeth 16 formed on outside surfaces of the side walls 61, 62.

The carriage unit 11 may be formed to have any suitable profile. This is particularly relevant for taking into account the fuel delivery conduits and manifolds, exhaust manifolds and cooling air flow paths.

Figure 3:
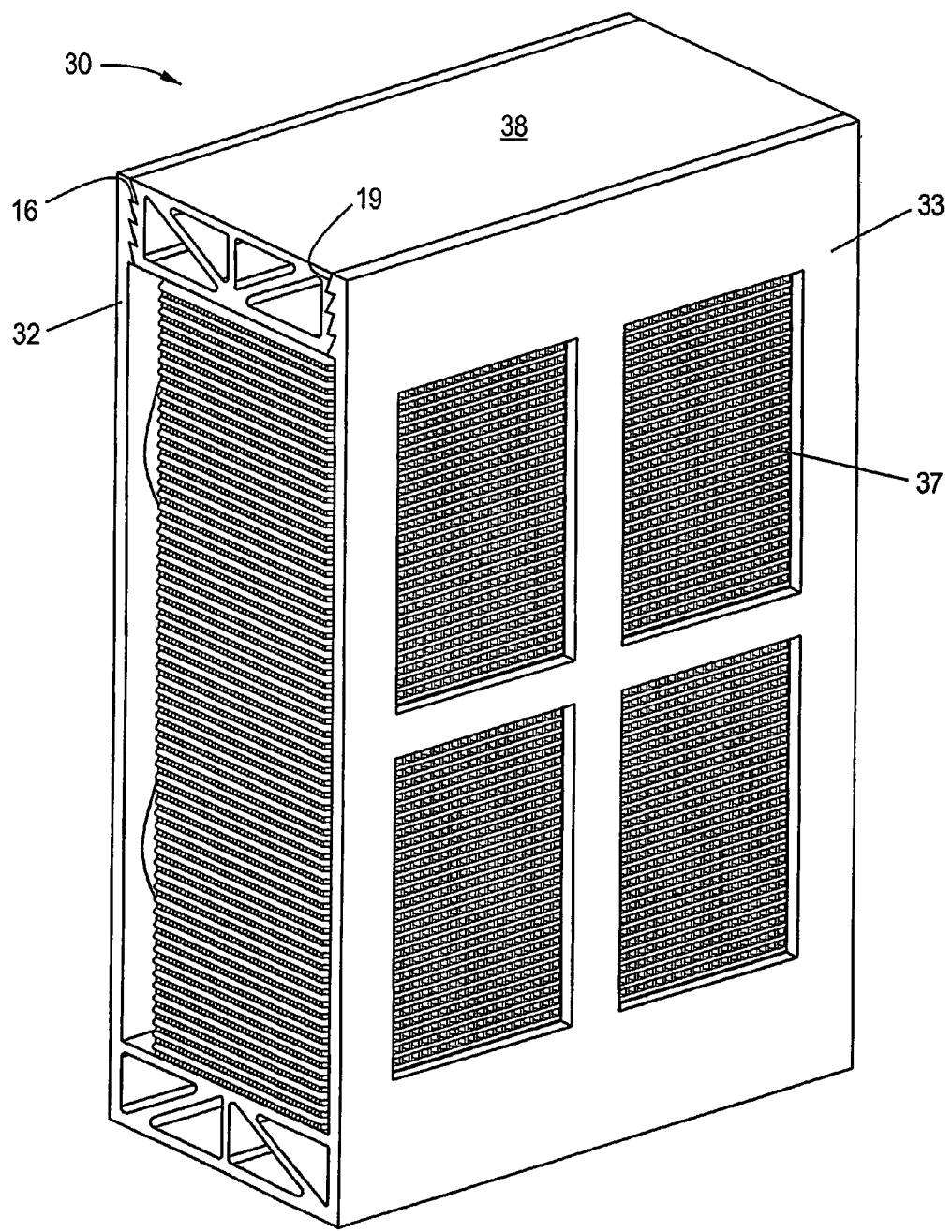
FIG. 3 shows a perspective front and side view of an assembled fuel cell with side wall ventilation apertures.

FIG. 3 illustrates a carriage unit 30 having a cuboid profile allowing for a relatively tall stack of thin plates. In carriage unit 30 the front and back face of the unit provides open access for the manifold ends of the individual fuel cell plates by which fuel is delivered, and the side walls 32, 33 are each of a "windowed" design, having four apertures 37 to allow through-flow of air for provision of oxidant and/or cooling. Only a short "ladder" of teeth 16 on the side walls 32, 33 are provided corresponding to the teeth 19 extending the full depth of the top member 38.

The apertures in the side walls of the fuel cell assembly may be accorded any suitable style commensurate with the required cross-section of air flow and material from which the side walls are formed. FIG. 7 shows a further exemplary embodiment of side wall 71 having two apertures 42, 73.

FIGS. 4 and 5 illustrate a carriage unit 40 having a cuboid profile allowing for a relatively tall stack of thin plates, having relatively large front and back faces providing greater access for the manifold ends of the individual fuel cell plates by which both fuel and oxidant and cooling fluids are delivered, thereby obviating the requirement for a "windowed" design of side wall.

In the fuel cell compression assembly of FIG. 6, the carriage unit 60 includes location features 63 for hydrogen fuel supply tanks. The carriage unit may also include other location features for any other system hardware such as fans, filters, electronics, solenoid valves, batteries etc. The carriage unit may also provide ducting for the fuel or oxidant fluid flows.

The preferred embodiments have been described herein as being formed from extruded aluminium, but generally any materials providing the requisite degrees of resilience and stiffness according to the component being formed can be used. Other examples include plastics materials or carbon composites. Where the carriage unit is formed from an electrically conductive material, some or all of the inside surfaces thereof may be coated with an electrically insulating material to ensure that there is no shorting of electrical current across the fuel cells.

Other embodiments are intentionally within the scope of the accompanying claims.

The invention claimed is:

1. A fuel cell compression assembly, comprising:
   a carriage unit having at least two opposing side walls maintained in spaced relation by a base member extending between the at least two opposing side walls;
   wherein the at least two opposing side walls and the base member define a cradle for receiving fuel cell plates, and wherein the at least two opposing side walls each includes engagement members on an internal face for engaging with a top member comprising a top of the carriage unit, the base member being below the engagement members;
   wherein the engagement members comprise corresponding engagement members spaced at intervals down the at least two opposing side walls;
   wherein the engagement members each comprise teeth projecting inwardly towards an internal volume of the carriage unit; and
   wherein at least one of the teeth has an asymmetric profile allowing passage of the top member in a first direction but not in a second direction that is opposite to the first direction.

2. The fuel cell compression assembly of claim 1, wherein the at least two opposing side walls are formed of a material having sufficient resilience to allow the top member to be engaged with the carriage unit by passage over, and temporary displacement of, at least some of the engagement members.

3. The fuel cell compression assembly of claim 1, wherein the teeth extend along a lateral extent of the at least two opposing side walls.

4. The fuel cell compression assembly of claim 1, wherein each of the teeth has an asymmetric profile allowing passage of the top member thereover in a first direction but not in a second direction opposite to the first direction.

5. The fuel cell compression assembly of claim 4, wherein each of the teeth has a profile allowing disengagement of the top member in a direction parallel to axes of the teeth.

6. The fuel cell compression assembly of claim 1, wherein each of the at least two opposing side walls includes ventilation apertures.

7. The fuel cell compression assembly of claim 1, wherein a direction of engagement of the top member relative to the at least two opposing side walls is perpendicular to a plane of the base member.

8. The fuel cell compression assembly of claim 1, wherein the top member comprises at least two corresponding engagement members for engaging with each of the engagement members on respective side walls of the carriage unit.

9. The fuel cell compression assembly of claim 1, wherein each engagement member is situated in a recess of one of the at least two opposing side walls.

10. The fuel cell compression assembly of claim 9, wherein the top member is adapted to be received into one or more recesses in the at least two opposing side walls.

11. The fuel cell compression assembly of claim 1, wherein the carriage unit comprises aluminium.

12. The fuel compression assembly of claim 1, wherein the base member and/or the top member comprise a box-section aluminum extrusion.

13. The fuel compression assembly of claim 1, further comprising location features on external walls of the fuel compression assembly, the location features for provision of fuel tanks or other system hardware.

14. A fuel compression assembly, comprising:
 a carriage unit cradle for receiving a stack of fuel cell plates and for maintaining at least some of the fuel cell plates overlapped; and
 a closure member adapted to close a carriage unit containing the carriage unit cradle and to apply pressure to the fuel cell plates via automatic locking engagement with the carriage unit cradle when the closure member is brought into position with the carriage unit cradle in a first direction that is orthogonal to a plane of the fuel cell plates;
 wherein the carriage unit cradle and the closure member comprise interlocking teeth that inhibit return of the closure member in a second direction opposite to the first direction; and
 wherein the interlocking teeth provide a plurality of automatic locking positions at varying distances along the first direction.

15. A method of forming a fuel cell stack, comprising:
 receiving a plurality of fuel cell plates in a confinement volume of a carriage unit cradle, the fuel cell plates forming a stack;
 applying a carriage unit closure member to compress the fuel cell plates in a first direction orthogonal to a plane of the fuel cell plates and to engage the closure member with the carriage unit cradle; and
 automatically locking the closure member and the cradle when the closure member reaches a predefined degree of compression of the fuel cell plates;
 wherein the carriage unit cradle and the closure member comprise interlocking teeth that inhibit return of the closure member in a second direction opposite to the first direction; and
 wherein the interlocking teeth provide a plurality of automatic locking positions at varying distances along the first direction.

16. The method of claim 15, further comprising passing through a series of successive automatic locking engagement positions between the closure member and the carriage unit cradle which are intermediate to a starting position and a final position at which the closure member has reached an appropriate degree of compression of the fuel cell plates.

* * * * *